Oct. 22, 1935.  S. EVANS ET AL  2,018,204

PLUNGER CONSTRUCTION

Filed July 24, 1934

Seth Evans
Henry B. Woods
INVENTOR.

BY Jesse R. Stone

ATTORNEYS.

Patented Oct. 22, 1935

2,018,204

UNITED STATES PATENT OFFICE 2,018,204

PLUNGER CONSTRUCTION

Seth Evans and Henry B. Woods, Houston, Tex., assignors to Hughes Tool Company, Houston, Tex., a corporation of Texas Application July 24, 1934, Serial No. 736,624

5 Claims. (Cl. 103—52)

This invention relates to plungers for use in pneumatically operated plunger lift pumps. In such pumps the plunger is forced from the lower end of the pump tubing to the surface with a load of liquid above it by the pressure of air or gas.

It is an object of the invention to provide a plunger particularly adapted to work in the presence of paraffin and similar substances tending to clog the movement of the plunger in the eduction tube.

It is desired to provide means on the plunger to scrape the paraffin from the tube and engage the same in grooves and recesses so that it will avoid clogging of the plunger.

It is also an object to provide a valve for the plunger so constructed that it will withstand snock and strain tending to break the same in use, and also shaped to hold the valve open on the downward stroke of the plunger.

In the drawing herewith, Fig. 1 is a side elevation of the improved plunger.

Figure 1:
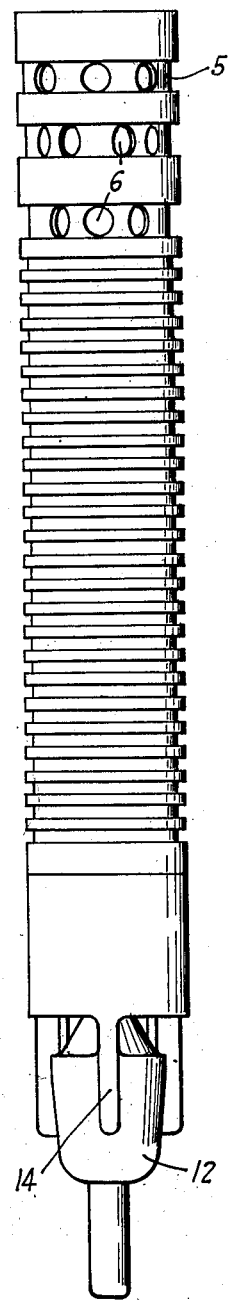
Figure 2:
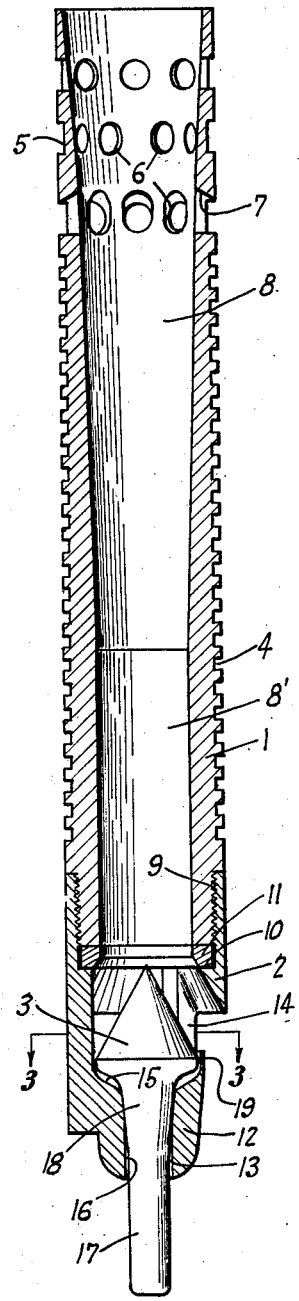
Fig. 2 is a central longitudinal section through the plunger.
Figure 3:
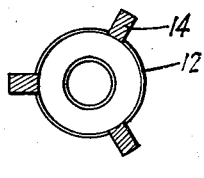
Fig. 3 is a transverse section taken on the plane 3—3 of Fig. 2.

The plunger is made up of a body 1 having a valve support 2 secured to its lower end and a valve member 3 on said support. The body 1 is cylindrical on its outer surface, said surface having a plurality of fairly deep circumferential grooves 4 therein. Adjacent the upper end of the body 1, the grooves 5 are made of increased width and the wall of the body is cut by openings 6 which open into the grooves 5. Said openings increase in diameter inwardly and the upper side of each opening may be beveled downwardly at 7. The interior of the body has a passage 8 tapered downwardly for a distance and then becomes cylindrical at 8'.

The lower end of the body is reduced in diameter and threaded at 9 to engage with the support 2 which has thereon an inwardly extending shoulder 10 to engage below the valve seat ring 11 and clamp said seat ring in position. The support 2 has a lower valve supporting member 12 connected to the upper end of said support by means of three legs 14. Said supporting member 12 has an upper recess 15 to receive the head of the valve 3. Below the recess is an axial bore or passage 16 through which projects the stem 17 of the valve.

The valve 3 is tapered upwardly to fit the seat ring 11 when said valve is moved to closed position by contact of the valve stem 17 with the lower stop in the tubing, not shown. The valve head is decreased in diameter downwardly and has a tapered portion 18 which engages the bore 16 in the support before the lower portion of the valve head contacts with the bottom of the recess 15. This provides a slight space around the lower portion of the head which becomes an area of lowered pressure when the plunger is falling due to the rush of fluid past the rim 19 of said recess and upwardly through the passage 8, 8'. This tends to retain the valve seated until the bottom of the tubing has been reached. Also the tapered fit of the stem in the opening is a wedging one which tends to frictionally hold the valve open until the stem engages its stop.

By reference to Fig. 1 it will be noted that the plunger and the valve have been streamlined as far as possible so as to facilitate the speed of falling. Further, the plunger is long so as to increase the weight for the same purpose.

The increased weight and speed also helps prevent the stopping of the down stroke of the plunger due to clogging by paraffin. The paraffin is scraped from the wall of the tubing and fills into the grooves 4. The bulk of such paraffin is scraped into the upper grooves 5 and passes through the openings 6 into the oil within the plunger and is discharged with said oil. The beveling of the upper walls of the openings 6 and 7, not only provides a better scraping edge but facilitates the passage of the paraffin into the plunger.

The shaping of the valve stem of enlarged diameter adjacent the head not only acts to stick the valve in open position and to keep the valve from contacting with the bottom of recess 15, but it strengthens the stem at the point where it is liable to fracture from fatigue and shock caused by its engaging the stop at the lower end of its stroke.

What we claim as new is:

1. A plunger of the character described adapted to operate in an eduction tube including a tubular body having an outer cylindrical periphery, grooves cut circumferentially about said body, the outer margins of said grooves having a scraping action on the wall of said tube, the uppermost grooves being widened and having openings therein to allow passage of material inwardly through the wall of said body, and a downwardly opening valve controlling the passage of fluid through said body.

2. A plunger of the character described including a tubular body having an outer cylindrical periphery, grooves cut circumferentially about said body, the uppermost grooves being widened and having openings therein to allow passage of material through the wall of said body, said openings being flared inwardly and having their upper walls beveled downwardly and outwardly, and a valve controlling the passage of fluid through said body.

3. A plunger of the character described comprising a tubular body grooved circumferentially on its outer surface and having a longitudinal fluid passage therethrough, a valve seat at the lower end of said passage, a valve support having a tapered opening, a valve thereon below said seat, and a downwardly tapered stem on said valve adapted to engage the opening in said support and frictionally retain said valve in position on said support.

4. A plunger of the character described including a tubular body, a valve seat at the lower end thereof, a support extending below said body, an upper recess in said support, a valve in said recess movable to engage said seat, and a stem on said valve extending through an axial opening in said support, the upper portion of said stem being enlarged to engage in said opening and hold said valve spaced slightly above the bottom of said recess when said valve is in open position.

5. A plunger of the character described including a tubular body, a valve seat at the lower end thereof, a support extending below said body, an upper recess in said support, a valve in said recess movable to engage said seat, a rim about said recess to direct fluid above said valve when said valve is open, and a stem on said valve extending through an axial opening in said support, the upper portion of said stem being enlarged to engage in said opening and hold said valve spaced slightly above the bottom of said recess when said valve is in open position.

SETH EVANS.
HENRY B. WOODS.